Oct. 31, 1967  W. B. BANKS  3,349,604
APPARATUS FOR DETERMINING PHYSICAL PROPERTIES OF MATERIALS
Filed July 22, 1966

William B. Banks
INVENTOR

BY
ATTORNEYS

United States Patent Office 3,349,604
Patented Oct. 31, 1967

3,349,604
APPARATUS FOR DETERMINING PHYSICAL
PROPERTIES OF MATERIALS
William B. Banks, Houston, Tex., assignor to Automation Products, Inc., Houston, Tex., a corporation of Texas
Filed July 22, 1966, Ser. No. 567,219
7 Claims. (Cl. 73—32)

ABSTRACT OF THE DISCLOSURE

An apparatus for determining a physical characteristic of a material where the material is held in a container and an elongated vibratory element is supported intermediate its ends in the container wall. The portion of the element outside the container is enclosed by a housing and supported at the same point as the vibratory element. The housing contains electromagnetic drive and pickup means for the vibratory element. The housing is of such size and has a natural resonant frequency equal to the vibratory element whereby torque stresses created at the common support are substantially equal and opposite.

---

Figure 1:
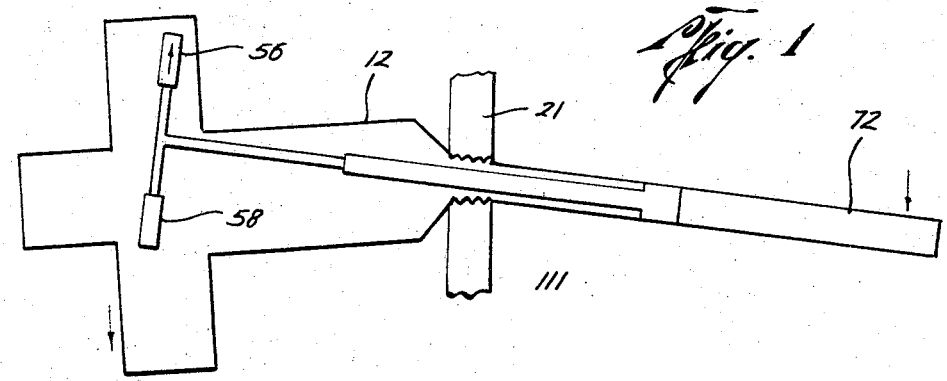

This application is a continuation-in-part of my copending patent application entitled "Apparatus for Determining Physical Properties of Materials," Serial No. 263,006, filed March 5, 1963, now Patent No. 3,282,084, which in turn is a continuation-in-part application of copending Patent Nos. 3,100,390 and 3,145,559.

The present invention is directed to an apparatus for determining physical properties of materials which is less sensitive to its mounting environment or external vibrations.

Generally, my above named patents are generally directed to providing vibratory means which is adapted to contact the material being measured in which the value or change in a physical property of the material contacting the vibratory means is measured or detected by measuring the change in vibration of the vibratory means. However, the vibrating type material sensing devices shown in the aforementioned patents are placed in tanks, pipelines or thin wall bins which sometimes absorb or dampen out the signal vibrations in the detector thereby interfering with the measurement. And in particular, the vibratory material sensing devices are particularly sensitive to mountings when they are operated at or near resonance as they are generally operated with low power and therefore more subject to external forces.

A general object of the present invention is the provision of a vibrating apparatus for determining physical properties of materials which is less sensitive to its mounting environment.

A still further object of the present invention is the provision of an apparatus for determining physical properties of materials having a flexible vibratory means which is supported intermediate its ends and in which one end is adapted to contact the material to be mesured and the second end is adapted to be transversely vibrated by means in a housing which is also supported at the same support point as the vibratory means and in which the torque stresses created by the vibratory means and the housing at the support point are substantially equal and opposite.

Still a further object of the present invention is the provision of an apparatus having a flexible vibratory means which is supported adjacent the node point of its natural resonant frequency and a housing supported from the same support point and including means for transversely vibrating and means for detecting the vibration of the vibratory means in which the natural resonant frequency of the housing and the natural resonant frequency of the flexible vibratory means are substantially equal whereby the troque created by the housing and by the vibratory means at the support point act oppositely and result in a lesser torque at the support point.

A still further object of the present invention is the provision of an apparatus having a flexible vibratory element sealingly supported intermediate its ends at the node point of its natural resonant frequency and in which one end is enclosed in a housing which includes means for vibrating the vibratory element and means for detecting changes in vibration of the vibratory element wherein the housing is supported at the same support point as the vibratory element and at the node point of the natural resonant frequency of the housing and in which the housing and vibratory element have substantially the same natural resonant frequency and the bending moment of the housing and of the vibratory element about the support point are substantially equal and opposite.

Yet a still further object of the persent invention is the provision of an apparatus for measuring the physical properties of materials which includes flexible vibratory means supported intermediate its ends at the node point of its natural resonant frequency and having a housing enclosing one end which includes driving means for transversely vibrating the flexible vibratory means at its natural resonant frequency and including detector means for detecting a change in the vibration of the flexible vibratory means, and a feed back oscillator having the input connected to the detector and output connected to the driving means whereby the flexible vibratory means is normally operated at its resonant frequency and in which the housing and the flexible vibratory means have substantially the same natural resonant frequency and are sized so that the torque stresses created at the common support point are substantially equal and opposite.

Figure 2:
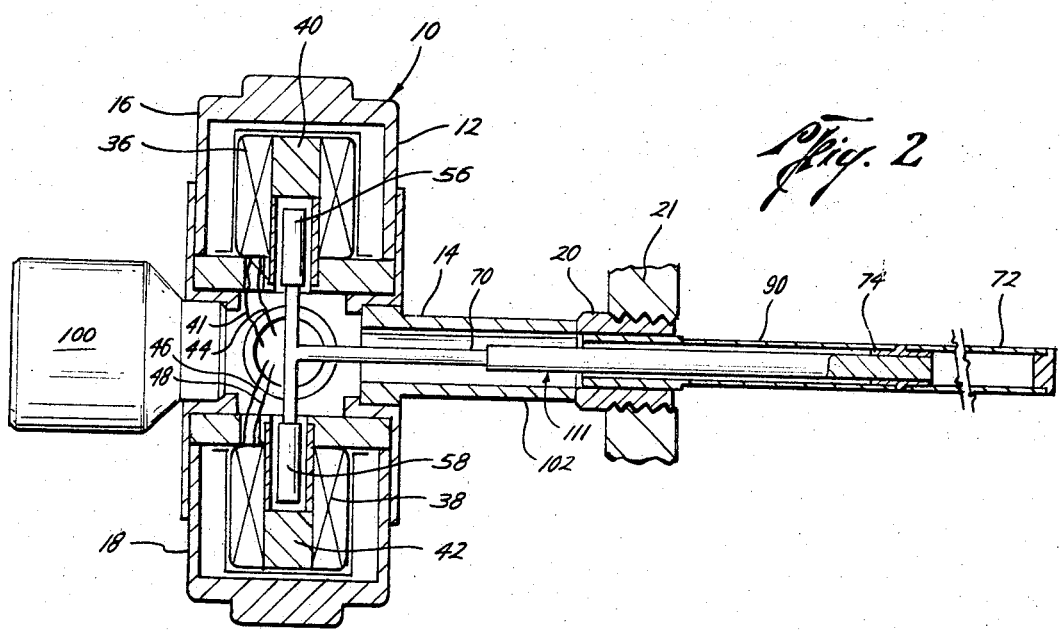
Figure 3:
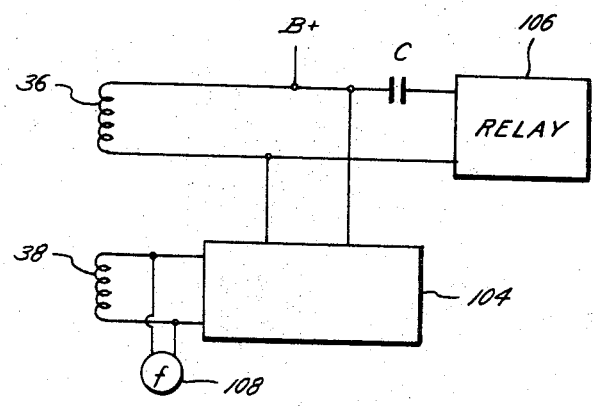

Other and further objects, features and advantages will be apparent from the following description of a presently preferred embodiment of the invention, given for the purpose of disclosure, and taken in conjunction with the accompanying drawings, where like character references designate like parts throughout the several views, and where, FIGURE 1 is an exaggerated schematic of one embodiment of the present invention, FIGURE 2 is an elevational view, in cross-section, of the embodiment of the invention of FIGURE 1, and FIGURE 3 is an electrical schematic of one control circuit of the present invention.

While the present improvement will be described in combination with a specific embodiment of a vibratory apparatus it will be understood that the present improvements can also be utilized with other vibratory measuring apparatus such as the embodiments disclosed in my copending application Serial No. 263,006 and in my Patents No. 3,100,390 and No. 3,145,559.

Referring now to the drawing, and particularly FIGURE 2, the reference numeral 10 generally indicates one specific embodiment of an apparatus for determining physical properties of a material and includes a housing 10 which includes a central T shaped tubular portion 14 and tubular side portions 16 and 18.

The central tubular portion 14 is connected to and supported by any suitable type connection such as a threadable connection 20 and thus is adapted to be connected to the wall 21 of a material container to provide a seal and thus maintain the material in the container under its normal operating pressures and conditions.

The housing 12 includes an electro-magnetic motor or transverse drive vibration means assembly in the housing end 16 such as an electro-magnetic coil 36 and a magnetic core 40. Electrical connections 41 and 44 supply the electrical current from an external source to the electro-magnetic coil 36 for attracting and releasing the flexible vibratory means as will be more fully described hereinafter.

The detector means or generator assembly is located in the housing end portion 18 and includes an electro-magnetic coil 38 and permanent magnet 42. Connected to the electro-magnetic coil 38 are electrical connections 46 and 48 which carry the current generated in the detecting coil 38 to any suitable electrical control or detecting means as will be more fully described hereinafter.

Inside of the housing, a magnetic armature 56 extends into the electrical magnetic coil 36 where it is attracted and released and thereby vibrates in response to the frequency of the electrical voltage applied to the electrical coil 36. A magnetic armature 58 is positioned adjacent the coil 38 and when vibrated creates a voltage in the coil 38 in proportion to the amplitude of vibration of the armature 58.

The vibratory means may be of any of the types such as described in my aforementioned co-pending patent application and patents and may include two vibratory rods 70 and 72 of different natural resonant frequencies, the rods being longitudinally aligned and connected one to another to form the vibratory means 111. Thus rod 70 may be a solid cylindrical rod of a certain natural resonant frequency and the rod 72 may be hollow tubular member of a lower natural resonant frequency. The rods 70 and 72 are longitudinally aligned and joined and sealed together by suitable means such as a sleeve 74. It is to be noted that a flexible tubular support member 90 is provided to support the vibratory means 111 and is in turn connected to and is supported by the connection 20 to the wall 21 of the material container. By way of example only, assuming that the applied frequency of the electromagnetic driving coil 36 is 120 cycles per second, the natural resonant frequency of the rod 70 may be 400 cycles per second and the natural resonant frequency of the tube 72 may be 100 cycles per second whereby the vibrations from the armature 56, which is connected to the rod 70, may be transmitted to and vibrate the tube 72. Thus, the rod 72 may act as a material sensing means and reach into the material container for contacting the material to be measured in response to the vibration of the armature 56. As the material being measured contacts the tube 72 the amplitude vibration of the armature 58 which is also connected to rod 70, will be affected and will provide an output signal in the detector coil 38.

The vibratory detector operates by providing a suitable electrical source connected to the electrical conductors 41 and 44 and thus to the coil 36 which constitutes the motor or drive by which the vibratory armature 56 is caused to vibrate and in turn vibrates the rod 70 and the tube 72 at the frequency of the applied electrical source. Thus a vibration of the vibratory element 111 is transmitted from the armature 56 to the tube 72 which is adapted to be contacted by the material to be measured. The vibration of the tube 72 will also affect the vibration of the detector armature 58 and the electro-magnetic or pickup coil 38 generates a voltage in proportion to the amplitude of vibration of the armature 58 in the magnetic field of the permanent magnet 42. Thus the value or changes in the physical properties of the material which contacts the tube 72 is reflected in the amount or change in the vibration transmitted to the vibrating pickup armature 58 which may be suitably connected to an electrical indicating or control means.

The above description and operation of one embodiment of a vibratory material measuring apparatus is generally described in my above named co-pending patent application. However, it has been found in some applications that the wall 21 of the material container, which may be a tank, a pipeline or a bin, from which the apparatus 10 is supported is flexible to some extent or subject to external vibrations which have an effect upon the vibratory instrument 10 such as absorbing or damping out vibrations in the apparatus 10 to cause errors or even inoperativeness of the apparatus 10. Therefore, the present improvement is directed to making the apparatus 10 less sensitive to its mountings and its environment.

Since both the housing 12 and the flexible vibratory means 111 are supported from the same common connection 20 to the wall 21, the present improvement is directed to making the bending moment of both the housing 12 and the flexible means created by the apparatus 10 equal at the point of mounting.

Referring now to FIGURE 1, in exaggerated form, it is noted that when the armature 56 is attracted by the coil 36 in the housing 12 and the vibratory means 11 is torqued about the support point in one direction, the housing 12 is torqued about the support point in the opposite direction. Of course, when the armature 56 is released by the coil 36 the interaction of the armatures 56 and 58 with respect to the coils 36 and 38 cause the vibratory means 111 to vibrate in the opposite direction, and similarly cause the housing 12 to reverse its direction of vibration. The torquing or twisting of the housing 12 and the vibratory means 111 about the common support point causes an undesirable effect, and of course any external vibrations in the wall 21 also affects the apparatus 10. The vibration in the support connection is particularly harmful when the apparatus 10 is operated at or near the resonant frequency of the vibratory means 111 since this is usually done at a low power input and thus any undesired effects would be particularly noticeable.

Referring now to FIGURE 2, one requirement for making the apparatus 10 less mounting sensitive is to make the natural resonant frequency of the housing substantially equal to the natural resonant frequency of the vibratory means 111, which generally includes the armatures 56 and 58 and the rod 70 and tube 72. Any suitable structure can be provided, but as normally the housing 12 has a much higher normal resonant frequency than the vibratory means 111, its natural resonant frequency can be lowered by adding a weight 100 to the housing and by elongating the tubular connection 102 of the section 14 which is connected to the threadable port 20 thereby decreasing its resonant frequency. Secondly, in order to insure that the oppositely desired torques are equal in amount, the bending moment of the housing 12 and the vibrating means 111 should be substantially equal at the operational frequency which depends upon such factors as the natural resonant frequency, the amplitude of vibration, the section modulus around which the members cantilever and their weight. By taking these factors into consideration the torque stresses created by the vibratory means and by the housing at the common support point will be substantially equal and opposite and thus will not interfere with each other and the instrument 10 will be less sensitive to the type of mounting on which it is secured.

Preferably, apparatus 10 is vibrated at its natural resonant frequency and therefore is very sensitive to its lower power level. Changes in the temperature, build up on the sensing tube 72, or corrosion act to change the natural resonant frequency. Therefore, in order to operate the apparatus at resonant frequency a control circuit such as shown in FIGURE 3 may be used in which the output from the detector coil 38 is fed to an oscillating circuit 104 to provide feed back oscillation at the resonant frequency of the vibratory means 111 by connecting the oscillator output circuit 104 to the drive coil 36. In this case the apparatus 10 will continue to operate at its natural resonant frequency unless submerged in a material having high energy losses such as powders, pellets, solids, or high viscosity liquids in which event the output will drop below a predetermined level which can then be sensed by the relay 106. Thus any physical properties as viscosity, material interfaces and material density can be measured. Changes in density can be measured by utilizing a frequency measuring instrument 108 which measures the changes in frequency as the oscillatory circuit 104 feeds back the output signal from the detector coils 38 through the driving coil 36 to maintain the vibratory means 111 at its normal resonant frequency and thus can measure changes in density of low energy losses such as changes from air, gas, water, kerosene and gasoline. However, normally, since the apparatus 10 is primarily designed to operate at its natural resonant frequency and detect changes causing high energy losses, the natural resonant frequency of the vibratory means 111 should remain substantially equal to the natural resonant frequency of the housing 12 sufficiently to avoid the vibratory mounting problems.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for determining physical properties of a material comprising,
   flexible vibratory means,
   a sealing support means supporting the vibratory means at a point intermediate its ends,
   material contacting sensing means secured to the vibratory means on one side of the support point,
   a housing on the second side of the support point,
   means in the housing adapted to transversely vibrate said vibratory means thereby transmitting transverse vibration to said material sensing means and to said housing,
   means in the housing for detecting a change in the vibration of the vibratory means,
   said housing being supported at said support point, said support point being adjacent the node point of both the vibratory means and the housing, said housing and said vibratory means having substantially the same natural resonant frequency.

2. The apparatus of claim 1 including,
   a feed back oscillator circuit having an input connected to the means for detecting a change in the vibration of the vibartory means, and having an output connected to the means for vibrating the vibratory means whereby the vibratory means is normally operated at its resonant frequency.

3. The apparatus of claim 1 wherein the means for transversely vibrating said vibratory means operates at the natural resonant frequency of said vibratory means.

4. The apparatus of claim 1 wherein the torque stresses created by the vibratory means and by the housing about the support point are substantially equal.

5. The apparatus of claim 4 wherein the means for transversely vibrating said vibratory means operates at the natural resonant frequency of said vibratory means.

6. In an apparatus for determining physical properties of a material having a flexible vibratory means, a sealing support supporting the vibratory means at a point intermediate its ends, material contacting sensing means secured to the vibratory means on one side of the support point, a housing on the second side of the support, means in the housing adapted to transversely vibrate said vibratory means thereby transmitting transverse vibration to said material sensing means and to the housing, means in the housing for detecting a change in the vibration of the vibratory means, the improvement comprising,
   said housing being supported at the support of the vibratory means, said support being adjacent the node point of the natural resonant frequency of both the vibratory means and the housing, said housing and said vibratory means having substantially the same natural resonant frequency.

7. In an apparatus for determining physical properties of a material having a flexible vibratory means, a sealing support supporting the vibratory means at a point intermediate its ends, material contacting sensing means secured to the vibratory means on one side of the support, a housing on the second side of the support, means in the housing adapted to transversely vibrate said vibratory means thereby transmitting transverse vibration to said material sensing means and said housing, means in the housing for detecting a change in the vibration of the vibratory means, the improvement comprising,
   said housing being supported at the support of the vibratory means, said support being adjacent the node point of the natural resonant frequency of both the vibratory means and the housing, said housing and said vibratory means having substantially the same natural resonant frequency, and
   said housing and said vibratory means being sized such that the bending movement of each about the support at the frequency of operation is substantially equal.

References Cited

UNITED STATES PATENTS

| | | | |
|---|---|---|---|
| 2,819,610 | 1/1958 | White | 73—59 |
| 2,839,915 | 6/1958 | Roth et al. | 73—59 |

FOREIGN PATENTS

| | | |
|---|---|---|
| 830,463 | 3/1960 | Great Britain. |

RICHARD C. QUEISSER, *Primary Examiner.*

J. J. GILL, *Examiner.*

JOHN P. BEAUCHAMP, *Assistant Examiner.*